(12) United States Patent
Jaeger (10) Patent No.: US 9,151,827 B2
(45) Date of Patent: Oct. 6, 2015

(54) COMPENSATING SLOWLY VARYING IF DC OFFSETS IN RECEIVERS

(71) Applicant: Infineon Technologies AG, Neubiberg (DE)

(72) Inventor: Herbert Jaeger, Linz (AT)

(73) Assignee: Infineon Technologies AG, Neubiberg (DE)

( * ) Notice: Subject to any disclaimer, the term of this patent is extended or adjusted under 35 U.S.C. 154(b) by 385 days.

(21) Appl. No.: 13/710,963

(22) Filed: Dec. 11, 2012

(65) Prior Publication Data
US 2014/0159943 A1 Jun. 12, 2014

(51) Int. Cl.
*G01S 7/40* (2006.01)
*G01S 7/35* (2006.01)
*G01S 7/03* (2006.01)
*G01S 13/34* (2006.01)

(52) U.S. Cl.
CPC ............ *G01S 7/354* (2013.01); *G01S 7/038* (2013.01); *G01S 7/4004* (2013.01); *G01S 13/343* (2013.01)

(58) Field of Classification Search
CPC ....... G01S 7/354; G01S 7/038; G01S 7/4004; G01S 13/343
USPC ............................ 342/89, 128, 159, 174, 198
See application file for complete search history.

(56) References Cited

U.S. PATENT DOCUMENTS

| | | | | |
|---|---|---|---|---|
| 4,593,287 A * | 6/1986 | Nitardy | | 342/200 |
| 5,990,738 A * | 11/1999 | Wright et al. | | 330/149 |
| 6,054,894 A * | 4/2000 | Wright et al. | | 330/149 |
| 6,054,896 A * | 4/2000 | Wright et al. | | 330/149 |
| 7,737,885 B2 | 6/2010 | Winkler | | |
| 7,952,501 B2 | 5/2011 | Kim et al. | | |
| 8,068,804 B2 | 11/2011 | Klesenski | | |
| 8,203,481 B2 * | 6/2012 | Wintermantel et al. | | 342/112 |
| 9,019,154 B2 * | 4/2015 | Jaeger et al. | | 342/173 |
| 9,020,454 B2 * | 4/2015 | Waheed et al. | | 455/114.3 |
| 2004/0041727 A1 * | 3/2004 | Ishii et al. | | 342/109 |
| 2008/0100500 A1 * | 5/2008 | Kondoh | | 342/109 |
| 2013/0154703 A1 * | 6/2013 | Jechoux et al. | | 327/159 |
| 2014/0159943 A1 * | 6/2014 | Jaeger | | 342/90 |

OTHER PUBLICATIONS

"Frequency-Modulated Continuous-Wave Radar"; Radar Basics http://www.radartutorial.eu/02.basics/rp07.en.html; Nov. 14, 2012, p. 1-2.

* cited by examiner

*Primary Examiner* — John B Sotomayor
(74) *Attorney, Agent, or Firm* — Eschweiler & Associates, LLC (57) ABSTRACT

The present disclosure relate to a receiver system that removes unwanted signal components from a received signal based upon signal information from previous received signals. The receiver system has a signal generator that generates multiple signal patterns. One of the multiple signal patterns is provided to a transmit antenna that wirelessly transmits the signal pattern. A receive antenna port receives a reflected signal comprising a time-shifted version of the signal pattern and provides the reflected signal to a reception path. A feedback path extends from the reception path to a signal correction element, which selectively generates a correction signal that reduces unwanted signal components in the reflected signal. The signal correction element generates the correction signal from compensation parameters stored in a memory, which correspond to previously received reflected signals comprising the signal pattern, so that the correction signal can be used to reduce unwanted signal components in real time.

21 Claims, 8 Drawing Sheets

COMPENSATING SLOWLY VARYING IF DC OFFSETS IN RECEIVERS

BACKGROUND

Radar systems are used to wirelessly detect the position of objects through the use of electromagnetic radiation. Frequency modulated continuous wave (FMCW) radar systems have become a common type of radar system. FMCW radars utilize a signal that continually changes frequency around a fixed reference frequency. Since the frequency of the signal continually changes with time, the frequency of a transmitted signal and a reflected signal will differ by a frequency that is proportional to the round trip time of the signal, giving a distance of a detected object.

Figure 1A:
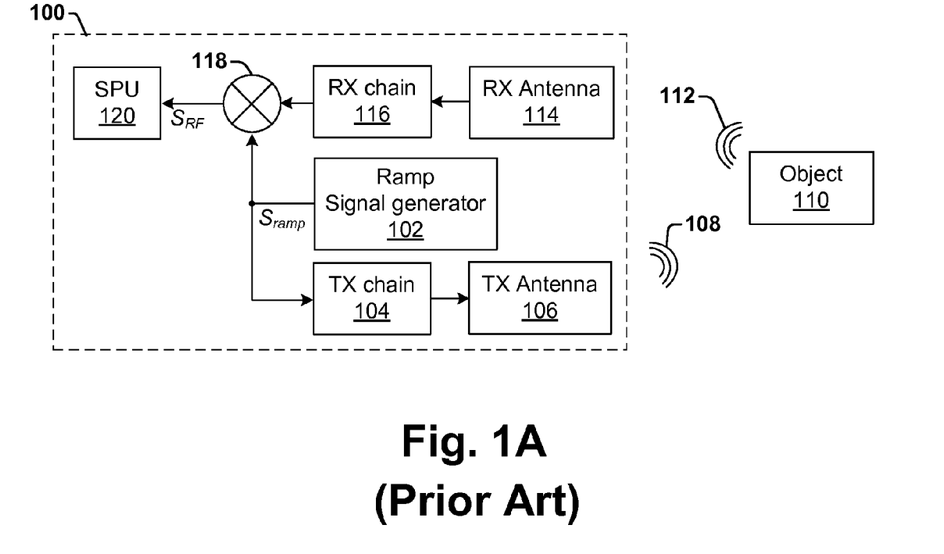
FIG. 1A is a block diagram of a FMCW (frequency modulated continuous wave) radar system.

FIG. 1A illustrates a block diagram of a typical FMCW radar system 100. FMCW radar system 100 comprises a transmission path and a reception path. A ramped signal generator 102 is configured to generate a ramped signal $S_{ramp}$ that is provided to a transmission chain 104 in the transmission path and a receive mixer 118 in the reception path. The transmission chain 104 generates a ramped RF signal that is transmitted as an electromagnetic wave 108 by a transmit antenna 106. Electromagnetic wave 108 reflects off of an object 110 as a reflected wave 112, which is returned to a reception antenna 114 that provides a reflected signal to a reception chain 116 that down-converts the reflected signal. The receive mixer 118 mixes the down-converted signal with the ramped signal $S_{ramp}$ to generate a signal having a frequency proportional to a position of the object 110, which is provided to a signal processing unit (SPU) 120.

Figure 1B:
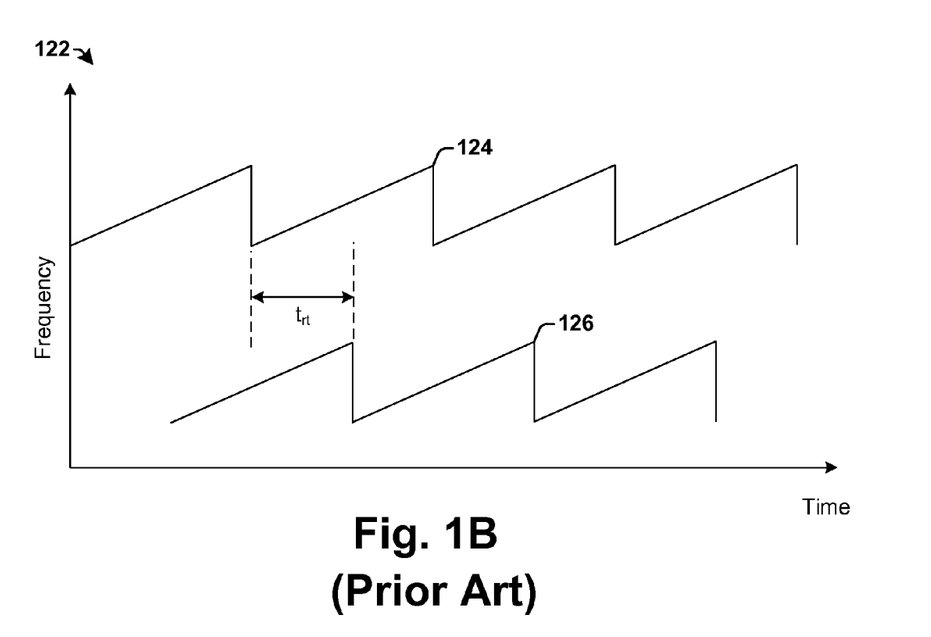
FIG. 1B is a timing diagram showing operation f the FMCW of FIG. 1A.

FIG. 1B illustrates a timing diagram 122 showing operation of FMCW radar system 100. As shown in timing diagram 122, a transmitted signal 124 has a continually varying linear frequency ramp with a sawtooth waveform, while a reflected signal 126 has a continually varying linear frequency ramp with a sawtooth waveform that is offset in time from transmitted signal 124 by a round-trip time $t_{rt}$ (corresponding to a frequency difference). The round-trip time $t_{rt}$ is proportional to the object's distance from the FMCW radar system, so that SPU 120 can measure a distance based upon the time $t_{rt}$ (e.g., $d_{FMCW} = (t_{rt} \cdot c)/2$).

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details.

In radars systems, signal leakage may occur from a transmission path to a reception path when simultaneously operated in close proximity. Such signal leakage may result in unwanted signal components (e.g., DC and/or low frequency components) in a reflected signal that often have a large amplitude. To prevent distortion and clipping in the reflected signal, the gain of the reception path can be set low. However, setting the gain of the reception path low limits the dynamic range of the reception path.

Alternatively, high pass filtering or AC coupling can be used to remove the unwanted signal components. However, filtering utilizes large capacitors which take a long time to settle, posing problems when the radar system is operated in a burst or 'duty cycle' mode, in which a transmitter is intermittently switched on and off. Setting filter capacitors to have a short time constant (i.e., to settle quickly) will alleviate the long settling time, but filters out useful low frequency signal components from close range targets. Alternatively, the transmitter can be switched on earlier (to allow extra time settling time), but switching the transmitter on earlier results in more power consumption and unwanted signal emissions.

Accordingly, the present disclosure relates to receiver system comprising a feedback path having a signal correction element configured to remove unwanted signal components from a received signal based upon signal information from previous received signals. The receiver system comprises a signal generator configured to generate a plurality of signal patterns. One of the plurality of signal patterns is provided to a transmit antenna configured to wirelessly transmit the signal pattern. A receive antenna port is configured to receive a reflected signal comprising a time-shifted version of the signal pattern and to provide the reflected signal to a reception path. A feedback path extends from the reception path to a signal correction element configured to selectively generate a correction signal that reduces unwanted signal components in the reflected signal. The signal correction element generates the correction signal from compensation parameters stored in a memory, which correspond to previously received reflected signals comprising the signal pattern, so that the correction signal can be used to reduce unwanted signal components in real time.

Figure 2:
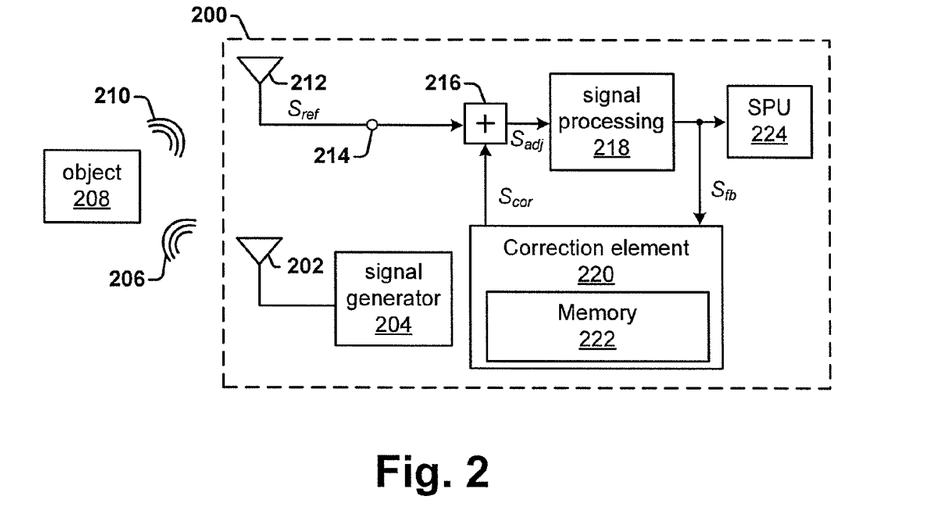
FIG. 2 is a block diagram of a radar system having a feedback path with a signal correction element.

FIG. 2 is a block diagram of a radar system 200 having a feedback path with a signal correction element 220 configured to generate a correction signal $S_{cor}$ that removes unwanted signal components from a reflected signal $S_{ref}$.

The radar system 200 comprises a signal generator 204 configured to generate a plurality of signal patterns. The signal generator 204 provides one of the plurality of signal patterns to a transmit antenna 202 configured to transmit the signal pattern as electromagnetic radiation 206. A receive antenna 212, having a constant coupling with the transmit antenna 202, is configured to receive a reflected signal 210 comprising a time shifted version of the signal pattern from an object 208. The reflected signal $S_{ref}$ is provided a receive antenna port 214, a downstream intermediate frequency (IF) signal processing element 218, and a downstream signal processing unit 224.

A feedback path, extending from an output of the IF signal processing element 218 to a signal correction element 220, provides a feedback signal $S_{fb}$ to the signal correction element 220. The signal correction element 220 is configured to perform a measurement sweep of the feedback signal $S_{fb}$ and from the measurement sweep to determine one or more compensation parameters corresponding to the received signal pattern. The signal correction element 220 comprises a memory element 222 configured to store compensation parameters corresponding to a plurality of signal patterns determined over a plurality of measurement sweeps.

After the signal correction element 220 has determined compensation parameters corresponding to a signal pattern, the signal correction element is able to generate a correction signal $S_{cor}$, based upon stored compensation parameters, which reduces unwanted signal components in a reflected signal $S_{ref}$ comprising the signal pattern. The correction signal $S_{cor}$ is subtracted from the reflected signal by adder 216 to generate an adjusted signal $S_{adj}$ that has reduced unwanted signal components.

Figure 3:
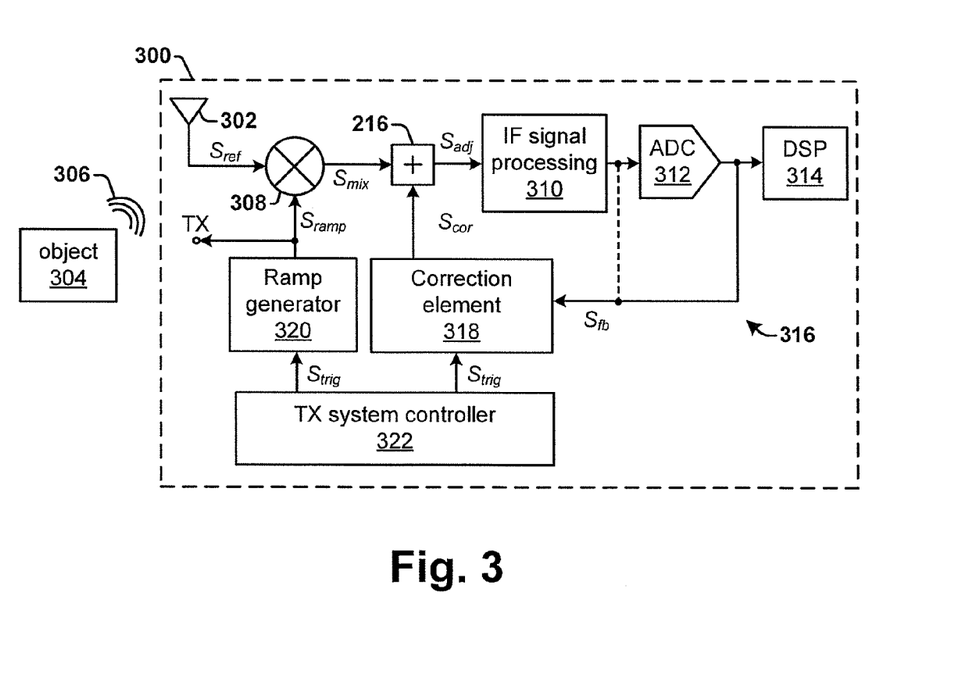
FIG. 3 is a block diagram of a FMCW radar system having a feedback path with a signal correction element.

FIG. 3 is a block diagram of a disclosed FMCW (frequency modulated continuous wave) radar system 300 having a feedback path 316 with a signal correction element 318 configured to generate a correction signal $S_{cor}$ that removes unwanted signal components from a reflected signal $S_{ref}$.

The FMCW radar system 300 comprises one or more receive antennas 302 configured to receive an electromagnetic signal 306 reflected from an object 304. In some embodiments, the one or more receive antennas 302 may comprise a single antenna configured to receive the electromagnetic signal 306. In other embodiments, the one or more receive antennas 302 may comprise an antenna array having a plurality of antennas, wherein respective antennas are configured to receive a different frequency channel of the electromagnetic signal 306.

The FMCW radar system 300 further comprises a ramped signal generator 320 configured to generate a plurality of ramped signal having a continually varying frequency ramp (e.g., a sawtooth waveform). The ramped signal generator 320 is controlled by a transmit system controller 322 that is configured to define one or more parameters of the ramped signals. A ramped signal $S_{ramp}$, comprising one of the plurality of ramped signals, is provided to a transmission path TX, which transmit a signal from the FMCW radar system 300, and to a receive mixer 308 located within the reception path. The receive mixer 308 also receives a reflected signal $S_{ref}$, which is based upon the electromagnetic signal 306, and mixes the reflected signal $S_{ref}$ with the ramped signal $S_{ramp}$. Mixing the reflected signal $S_{ref}$ with the ramped signal $S_{ramp}$ provides for a mixed signal $S_{mix}$ having a frequency that is proportional to a distance between the FMCW radar system 300 and the object 304.

The mixed signal $S_{mix}$ is provided to an IF signal processing element 310. The IF signal processing element 310 may comprise a modulation element, one or more amplifiers, and one or more filtering elements. The IF signal processing element 310 is configured to generate an amplified, down-converted mixed signal $S_{mix}'$ that is input to an analog-to-digital converter (ADC) 312 configured to convert the mixed signal $S_{mix}'$ from an analog signal to a digital signal. The digital signal is provided to a digital signal processor 314 configured to process the digital signal to determine a location of the object 304.

The amplified, down-converted mixed signal $S_{mix}'$ is also provided to a feedback path 316 that provides a feedback signal $S_{fb}$ to a signal correction element 318. The feedback path 316 extends to the signal correction element 318 from a location in the reception path that is downstream of the receive mixer 308. In some embodiments, the feedback path 316 may extend from an output of IF signal processing element 310 to the signal correction element 318. In other embodiments, the feedback path 316 may extend from an output of ADC 312 to the signal correction element 318.

The signal correction element 318 is configured to receive the feedback signal $S_{fb}$ from the feedback path 316, and a trigger signal $S_{trig}$ from transmit system controller 322, which indicates a change in the ramped signal $S_{ramp}$. Based upon the trigger signal $S_{trig}$ and the feedback signal $S_{fb}$, the signal correction element 318 is configured to determine unwanted signal components of a mixed signal $S_{mix}$ (e.g., low frequency and/or DC components) corresponding to a ramped signal indicated by the trigger signal $S_{trig}$. For example, the signal correction element 318 may perform a measurement sweep of a feedback signal $S_{fb}$ over a period of time to determine unwanted signal components of a mixed signal corresponding to a ramped signal indicated by the trigger signal $S_{trig}$.

The signal correction element 318 is configured to store compensation parameters corresponding to unwanted signal components of different ramped signals. For example, the signal correction element 318 is configured to store compensation parameters corresponding to unwanted signal components of a first ramped signal, compensation parameters corresponding to unwanted signal components of a second ramped signal, etc. By storing compensation parameters corresponding to unwanted signal components of different ramped signals, the signal correction element 318 is able to generate a correction signal $S_{cor}$ that reduces unwanted signal components based upon signal information from a previous measurement sweep of a ramped signal.

For example, if the transmit system controller 322 outputs a trigger signal $S_{trig}$ corresponding to a first ramped signal, the ramped signal generator 320 will output a first ramped signal that is provided to receive mixer 308. The trigger signal $S_{trig}$ indicates to the signal correction element 318 that the first ramped signal is being received. If ramped signal generator 320 has previously used the first ramped signal, the signal correction element 318 will have stored compensation parameters corresponding to the first ramped signal from a previous measurement sweep. Therefore, upon receiving the trigger signal $S_{trig}$ the signal correction element 318 will generate a non-zero correction signal based upon the stored compensation parameters corresponding to the first ramped signal. Alternatively, if the ramped signal generator 320 has not previously used the first ramped signal (i.e., if a ramped signal is used for a first time), the signal correction element 318 will not have stored compensation parameters corresponding to the first ramped signal and will not generate a non-zero correction signal. Rather, the signal correction element 318 will calculate one or more compensation parameters at the end of a measurement sweep of the first ramped signal and will store the compensation parameters to be used when the first ramped signal is used again.

The correction signal is provided to an adder 216 configured to subtract the correction signal $S_{cor}$ from the mixed signal $S_{mix}$ to generate an adjusted signal $S_{adj}$ having reduced unwanted signal components. In some embodiments, adder 216 is positioned upstream of the IF signal processing element 310. By eliminating the unwanted signal components prior to IF signal processing, the gain of the IF signal processing can be set higher allowing the intermediate frequency (IF) signal processing stages to be better utilized.

Therefore, substantially constant coupling paths between transmitter and reception paths of the FMCW radar system 300 allow for the signal correction element 318 to generated compensation parameters associated with unwanted signal components of a ramped signal, and upon a ramped signal being used to subsequently access the compensation parameters to generate a correction signal in real time.

Figure 4:
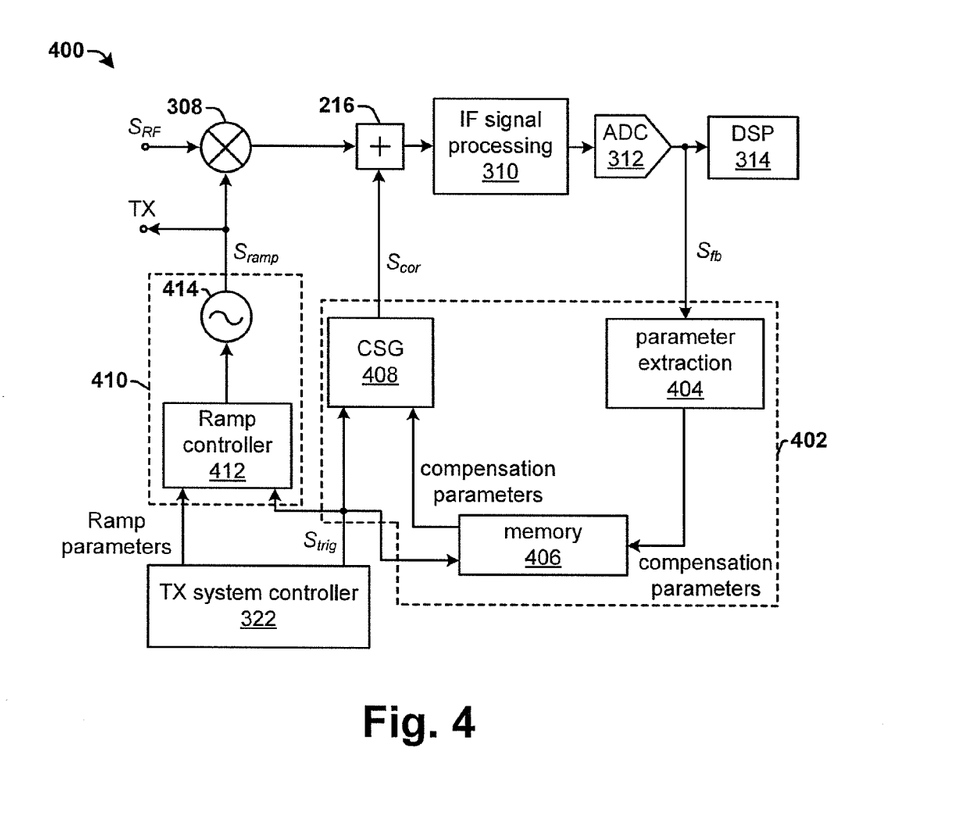
FIG. 4 is a block diagram of a FMCW radar system having a feedback path with a signal correction element.

FIG. 4 illustrates a more detailed block diagram of some embodiments of a disclosed FMCW radar system 400. The FMCW radar system 400 comprises a ramped signal generator 410 and a signal correction element 402.

The ramped signal generator 410 comprises a ramp controller 412 and a controlled oscillator 414. The ramp controller 412 is configured to receive one or more ramp parameters and a trigger signal $S_{trig}$ from a transmit system controller 322. The one or more ramp parameters define a ramped signal $S_{ramp}$ to be generated by the controlled oscillator 414. Based upon the one or more ramp parameters, the ramp controller 412 is configured to operate the controlled oscillator 414 to generate the ramped signal $S_{ramp}$, which is provided to a transmission path TX and to a receive mixer 308 located within a reception path. The trigger signal $S_{trig}$ indicates a change in the ramped signal $S_{ramp}$.

The signal correction element 402 comprises a parameter extraction element 404, a memory element 406, and a correction signal generator 408.

The parameter extraction element 404 is configured to receive a feedback signal $S_{fb}$ from the reception path and to generate one or more compensation parameters based upon a measurement sweep comprising a temporal section of the feedback signal $S_{fb}$ (e.g., a 2 us section of the feedback signal). The one or more compensation parameters are provided to the memory element 406, which is configured to store one or more compensation parameters corresponding to unwanted signal components associated with the ramped signal $S_{ramp}$. For example, the memory element 406 is configured to store one or more compensation parameters corresponding to unwanted signal components associated with a first ramped signal, one or more compensation parameters corresponding to unwanted signal components associated with a second ramped signal, etc.

In some embodiments, the memory element 406 may comprise non-volatile memory configured to store one or more compensation parameters when FMCW radar system 100 is not powered. In such embodiments, upon providing power to the FMCW radar system 100, one or more compensation parameters stored in memory element 406 from prior operation of the FMCW radar system 100 can be used to immediately remove unwanted signal components of a received reflected signal. In some embodiments, one or more compensation parameters may be initially pre-loaded into the memory element 406 (e.g., based on pre-manufacturing simulations or test data) and subsequently updated based upon the feedback signal $S_{fb}$.

In some embodiments, the one or more compensation parameters corresponding to a ramped signal may comprise an average of compensation parameters determined over a plurality of measurement sweeps. For example, if a measurement sweep is performed on a reflected signal comprising a ramped signal having stored compensation parameters, the memory element 406 can store an average of the already stored compensation parameters and new compensation parameters determined from the measurement sweep.

The correction signal generator 408 is configured to receive the trigger signal $S_{trig}$ from transmit system controller 322 and one or more compensation parameters corresponding to the ramped signal $S_{ramp}$ from memory element 406. Based upon the one or more compensation parameters, the correction signal generator 408 is configured to generate a correction signal $S_{cor}$ that accounts for unwanted signal components (e.g., low frequency or DC signal components) in the mixed signal.

In various embodiments, the correction signal $S_{cor}$ may comprise a polynomial correction signal having any order polynomial function. For example, in some embodiments, the correction signal $S_{cor}$ may comprise a first order polynomial function (e.g., a constant and a linear ramp signal), while in other embodiments the correction signal $S_{cor}$ may comprise a second or higher order polynomial function. In other embodiments, the correction signal $S_{cor}$ may comprise other functions, such as harmonic functions (e.g., sine and cosine functions) for example.

Figure 5A:
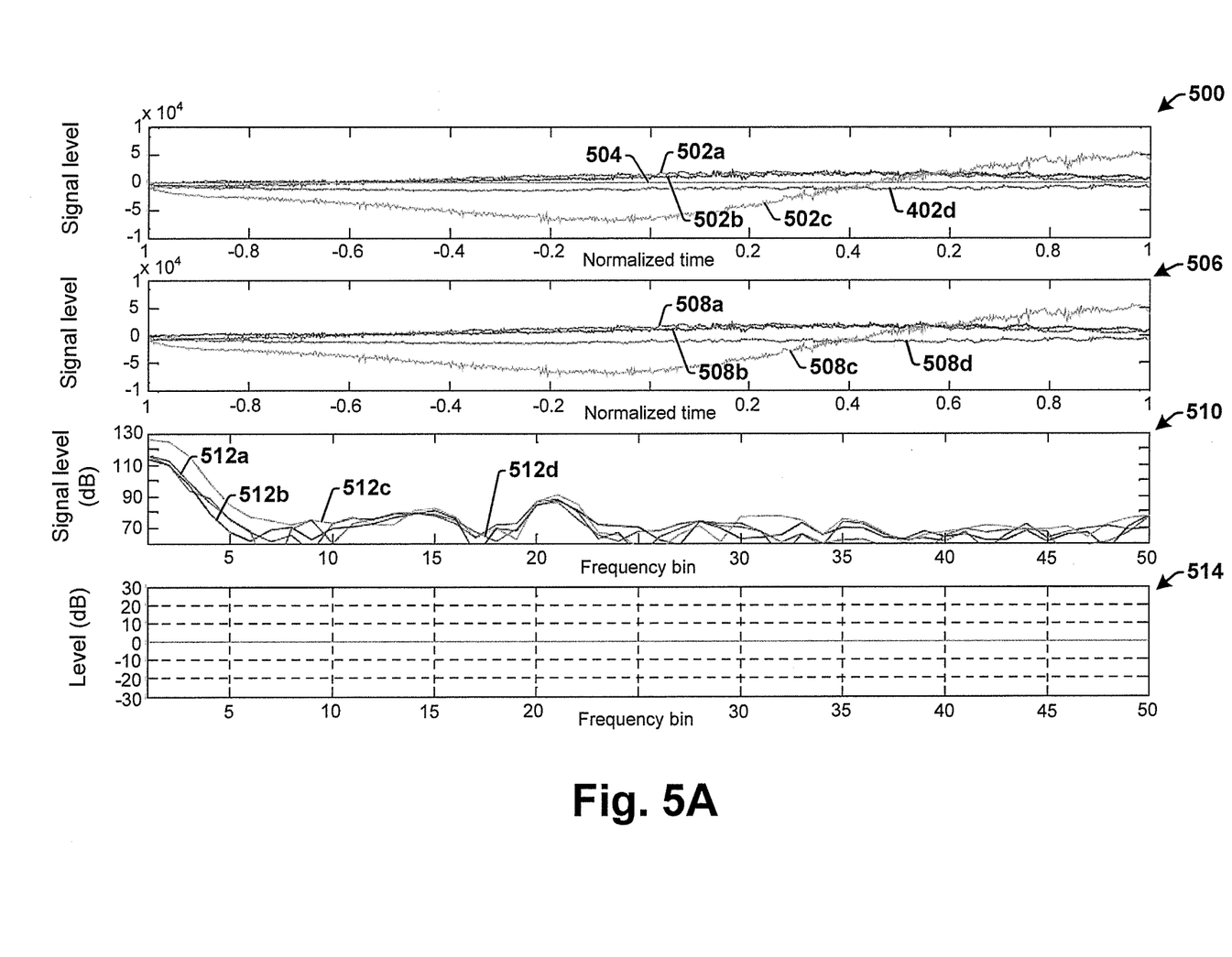
FIGS. 5A-5B illustrate graphs showing the reduction in unwanted low frequency and/or DC signals.
Figure 5B:
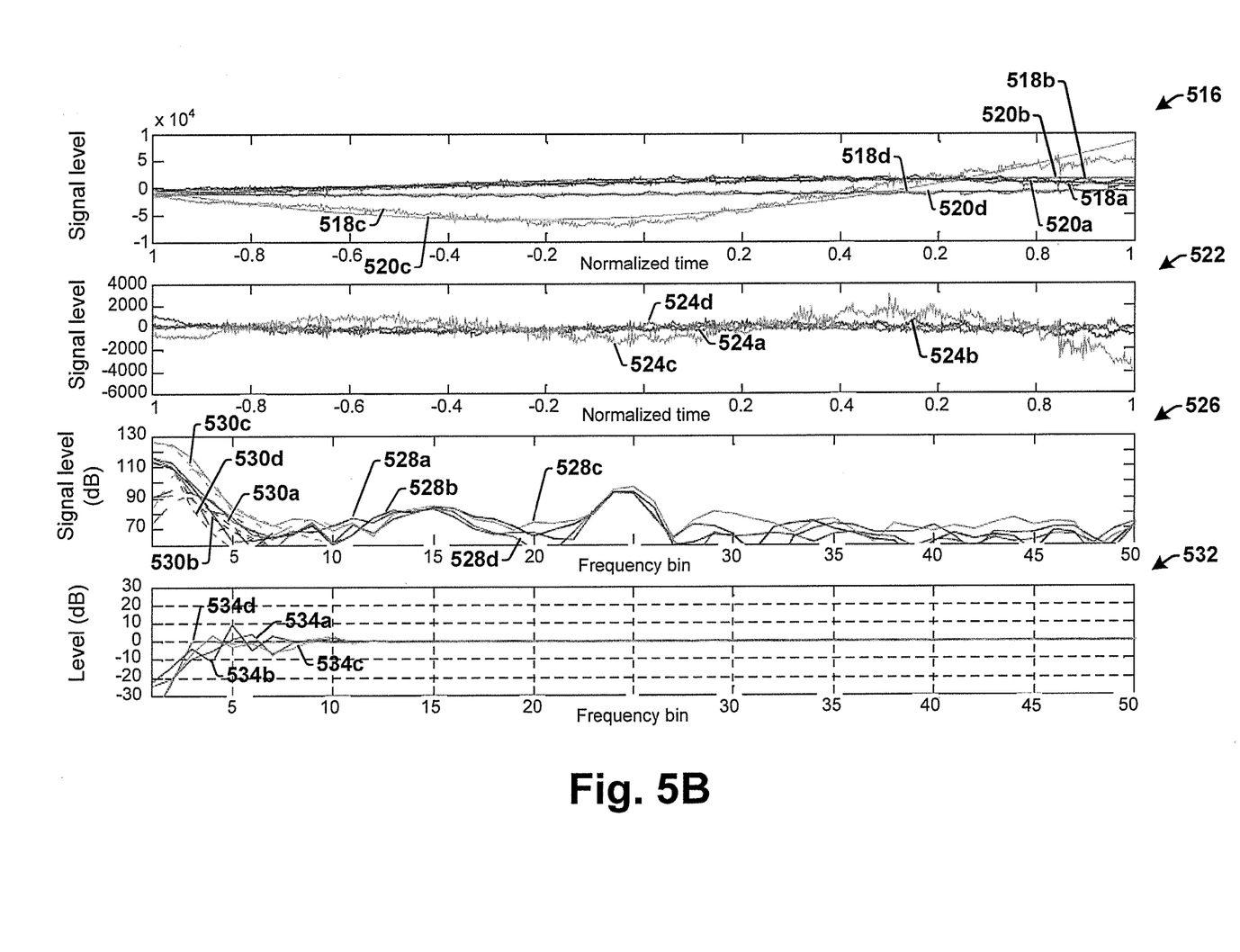

FIGS. 5A-5B illustrate graphs showing operation of a disclosed FMCW radar system having a feedback path with signal correction element. Graphs 500, 506, 510, and 514 illustrate the disclosed FMCW radar system operating on a reflected signal having no stored compensation parameters. Graphs 516, 522, 526, and 532 illustrate the disclosed FMCW radar system operating on a reflected signal having stored compensation parameters.

Graph 500 illustrates a signal strength of a reflected signal (y-axis) as a function of time (x-axis) for a measurement sweep of the reflected signal having a normalized time of 2 units. As shown in graph 500, the reflected signal comprises four frequency channels 502a-502d. The signal strength of each of the four frequency channels 502a-502d has a high frequency component and low frequency and/or DC components. For example, frequency channel 502c has a low frequency component having a half period of approximately 1.4 units. Graph 500 further illustrates a correction signal 504. Since no compensation parameters are stored for a ramped signal of the reflected signal 502, the correction signal 504 has a constant value of zero.

Graph 506 illustrates a signal strength of a reflected signal that has been adjusted according to the correction signal 504 (y-axis) as a function of time (x-axis). As shown in graph 506, since the correction signal 504 has a constant value of zero, the signal strength of the adjusted signal in graph 508a-508d is equal to the signal strength of the reflected signal in graph 500.

Graph 510 illustrates a signal strength of a reflected signal that has been adjusted according to the correction signal 504 (y-axis) as a function of frequency (x-axis). As shown in graph 510, the reflected signal 512a-512d has a high signal strength at low frequencies and at DC frequencies corresponding to unwanted signal components.

Graph 514 illustrates a reduction in the signal level provided by the correction signal 504 (y-axis) as a function of frequency (x-axis). As shown in graph 514, since the correction signal 504 has a constant value of zero, the signal level of the reflected signal is not adjusted at any frequency.

Graph 516 illustrates a signal strength of a reflected signal (y-axis) as a function of time (x-axis) for a measurement sweep of the reflected signal. As shown in graph 516, the reflected signal comprises four frequency channels 518a-518d having a high frequency component and low frequency and/or DC components. Graph 516 further illustrates correction signals 520a-520d for each of the four frequency channels. For example, a first correction signal 520a is selected to reduce the unwanted low frequency signal of a reflected signal in the first frequency channel 518a, a second correction signal 520b is selected to reduce the unwanted low frequency signal of a reflected signal in the second frequency channel 518b, etc. Since compensation parameters are stored for a ramped signal of reflected signal 518, the correction signals 520a-520d have a non-zero value.

Graph 522 illustrates a signal strength of an adjusted signal that has been adjusted according to the correction signals 520a-520d (y-axis) as a function of time (x-axis). Since the correction signals 520a-520d have a non-zero value, they reduce the unwanted signal components, resulting in adjusted signals 524a-524d for each of the four channels that have a signal strength less than that of the reflected signal in graph 516.

Graph 526 illustrates a signal strength of the adjusted signal (y-axis) as a function of frequency (x-axis). As shown in graph 526, the signal level of the adjusted signal 530a-530d is reduced at low frequencies and at DC frequencies relative to the unadjusted signals 528a-528d, but is relatively unchanged at higher frequencies. Therefore, the correction signals 520a-520d accurately reduce unwanted low frequency and DC signal components without altering higher frequency useful signal components.

Graph 530 illustrates a reduction in the signal level provided by the correction signals 520a-520d (y-axis) as a function of frequency (x-axis). As shown in graph 530, the signal levels of the adjusted signals 530a-530d are reduced by between approximately 20 to 30 dB for DC signals and for smaller amounts for low frequency signals. Furthermore, for higher frequencies, the signal levels of the adjusted signals 530a-530d are not reduced.

Figure 6A:
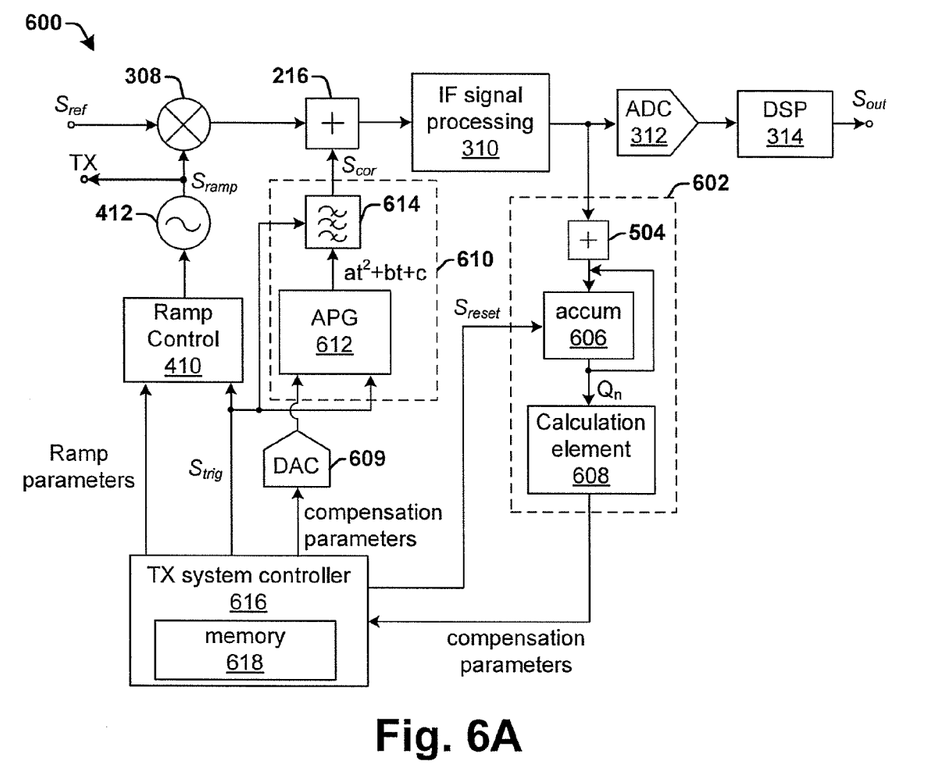
FIGS. 6A-6B illustrate a FMCW radar system having a feedback path comprising an analog polynomial generator configured to generate a correction signal.

FIG. 6A is a block diagram of a disclosed FMCW radar system 600 having a feedback path comprising an analog polynomial generator 610 configured to generate a correction signal $S_{cor}$ that accounts for unwanted signal components in a reflected signal.

The feedback path comprises an IF (intermediate frequency) parameter extraction element 602. The IF parameter extraction element 602 is configured to time divide a received measurement sweep of a reflected signal into an equal number of sections, to sum the signal within the sections, and from the sums to generate one or more compensation parameters. For example, in some embodiments the IF parameter extraction element 602 is configured to divide a received signal into four equal time-domain quarters. The IF parameter extraction element 602 then sums the signal within the quarters and from the sums calculates compensation parameters for a square law polynomial correction signal.

In some embodiments, the IF parameter extraction element 602 comprises an adder 604 connected to an accumulator 606. A feedback path extends from the output of the accumulator 606 to an input of the adder 604, such that the output of the accumulator 606 is added to a feedback signal $S_{fb}$ received by the adder 604. By adding the output of the accumulator 606 to a feedback signal $S_{fb}$, the accumulator 606 sums the reflected signal to generate one or more partial sums $Q_n$ for a measurement sweep. The one or more partial sums $Q_n$ are provided to a compensation parameter calculation element 608 configured to calculate one or more compensation parameters from the partial sums $Q_n$.

In some embodiments, the accumulator 606 is configured to receive a reset signal $S_{reset}$ from the transmit system controller 616. The reset signal $S_{reset}$ resets the value of the accumulator 606 in a manner that splits the measurement sweep into a plurality of sections in the time-domain. By splitting the measurement sweep into a plurality of sections, a partial sum $Q_n$ is generated for each section. In some embodiments, the reset signal comprises the trigger signal $S_{trig}$.

In one embodiment, the IF parameter extraction element 602 is configured to generate first, second, and third compensation parameters (a, b, and c) for a second order polynomial correction signal. In such an embodiment, the IF parameter extraction element 602 splits a measurement sweep into four quarters. The accumulator 606 is configured to generate partial sums, $Q_1$-$Q_4$, for the four quarters of the measurement sweep. The partial sums, $Q_1$-$Q_4$, are provided to the compensation parameter calculation element 608, which determines the compensation parameters as follows:

$$a = -Q_1 - Q_2 + Q_3 + Q_4,$$

$$b = 2*(Q_1 - Q_2 - Q_3 + Q_4), \text{ and}$$

$$c = \frac{1}{6}(-Q_1 + 7*Q_2 + 7*Q_3 - Q_4).$$

The IF parameter extraction element 602 is configured to write the one or more compensation parameters to a memory element 618 configured to store one or more compensation parameters corresponding to various ramped signals. In some embodiments, the memory element 618 may be comprised within the transmit system controller 616.

The transmit system controller 616 is configured to provide the one or more compensation parameters corresponding to the ramped signal $S_{ramp}$ to an analog polynomial generator 612 by way of a digital-to-analog converter (DAC) 609 configured to convert the compensation parameters from a digital signal to an analog signal. The analog polynomial generator 612 is configured to generate an analog correction signal $S_{cor}$ comprising a polynomial function. The analog correction signal $S_{cor}$ may be filtered by a filtering element 614 before being provided to adder 216, which subtracts the correction signal $S_{cor}$ from the mixed signal $S_{mix}$ to reduce unwanted signal components.

Figure 6B:
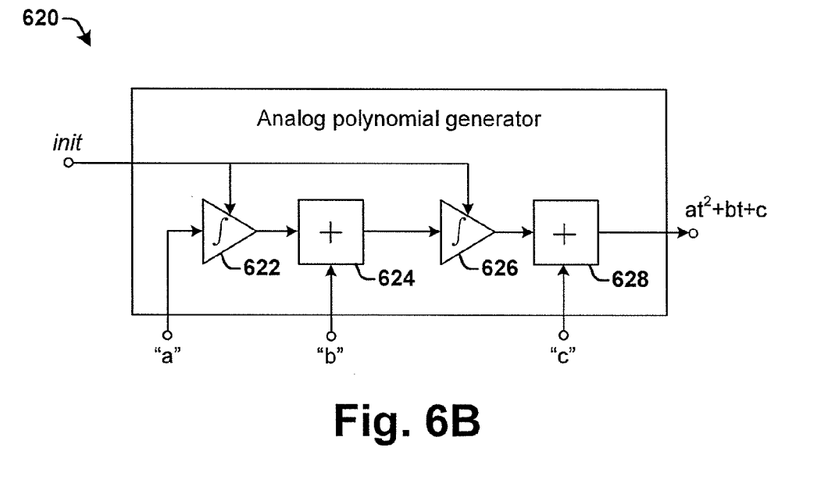

FIG. 6B is a block diagram of some embodiments of an analog polynomial generator 620 configured to generate a second degree polynomial (e.g., $at^2 + bt + c$).

The analog polynomial generator 620 comprises a first analog accumulator 622, a first adder 624, a second analog accumulator 626, and a second adder 628. The first accumulator 622 is configured to receive an initialization signal (e.g., trigger signal $S_{trig}$) and a first compensation parameter a. Upon receiving the initialization signal, the first accumulator 622 begins to integrate the value of a in time to generate a signal having a value of at. The first adder 624 is configured to add the output of the first accumulator 622 to a second compensation parameter b to generate a signal having a value of at +b. The second accumulator 626 is configured to receive the initialization signal and the signal having a value of at +b. Upon receiving the initialization signal, the second accumulator 626 begins to integrate the value of at +b in time to generate a signal having a value of $at^2 + bt$. The second adder 628 is configured to add the output of the second accumulator 626 to a third compensation parameter c to generate a correction signal $S_{cor}$ comprising a second order polynomial having a value of $at^2 + bt + c$.

Figure 7A:
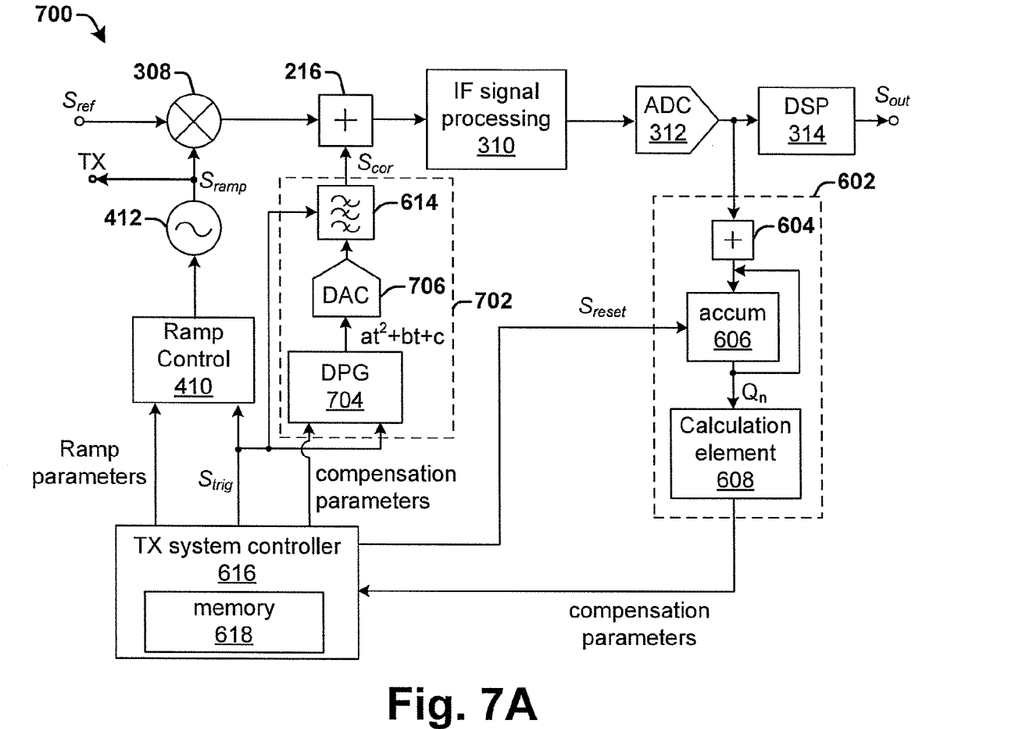
FIGS. 7A-7B illustrate a FMCW radar system having a feedback path comprising a digital polynomial generator configured to generate a correction signal.

FIG. 7A is a block diagram of a disclosed FMCW radar system 700 having a feedback path comprising a digital polynomial generator 704 configured to generate a correction signal $S_{cor}$ that accounts for unwanted signal components in a reflected signal.

The digital polynomial generator 704 is configured to receive one or more compensation parameters from a memory element 618 and from the one or more compensation parameters to generate a digital correction signal $S_{cor}$ comprising a polynomial function. The digital correction signal $S_{cor}$ is provided to a digital-to-analog converter 706 configured to convert to the digital correction signal $S_{cor}$ to an analog signal. The analog signal may be filtered by a filtering element 614 before being provided to adder 216, which subtracts the correction signal $S_{cor}$ from the mixed signal $S_{mix}$ to reduce unwanted signal components.

Figure 7B:
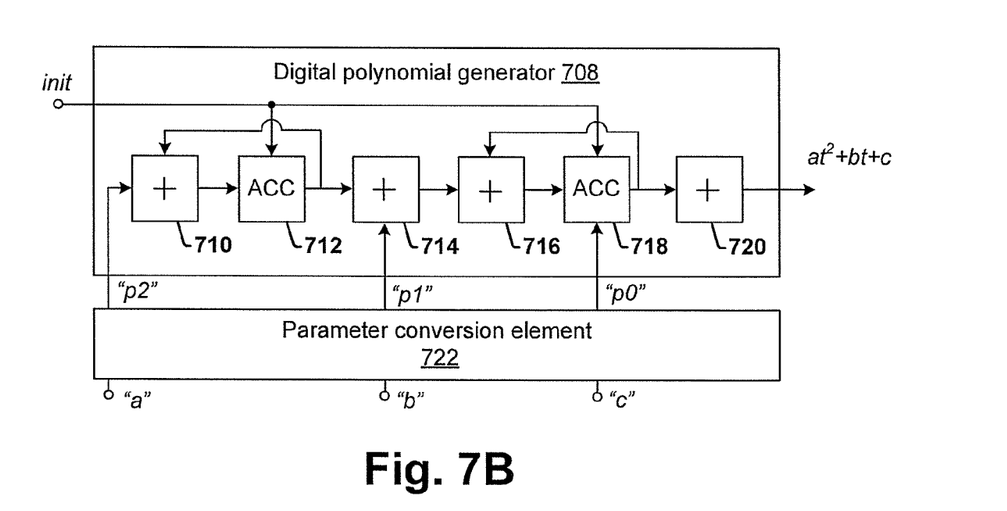

FIG. 7B is a block diagram of some embodiments of a digital polynomial generator 708. The digital polynomial generator 708 comprises a first adder 710, a first digital accumulator 712, a second adder 714, a third adder 716, a second digital accumulator 718, and a fourth adder 720. The first adder 710 is configured to receive an initialization signal init (e.g., trigger signal $S_{trig}$) and a first input parameter $p_2$. The first adder 710 has an output node connected to an input node of the first accumulator 712. A feedback path extends from an output node of the first accumulator 712 to an input node of the first adder 710, to generate a signal having a value of $p_2t$. The second adder 714 is configured to add a second input parameter $p_1$ to the signal having a value of $p_2t$ to generate a signal having a value $p_2t+p_1$. The second adder 714 has an output node connected to an input node of a third adder 716. The third adder 716 has an output node connected to an input node of the second accumulator 718. A feedback path extends from an output node of the second accumulator 718 to an input node of the third adder 716, to generate a signal having a value of $\frac{1}{2}p_2t^2-\frac{1}{2}p_2t+p_1t$. The fourth adder 720 has an input node connected to an output node of the second accumulator 718 and is configured to add a third input parameter $p_0$ to the signal having a value of $\frac{1}{2}p_2t^2-\frac{1}{2}p_2t+p_1t$, to generate an output signal having a value $\frac{1}{2}p_2t^2-\frac{1}{2}p_2t+p_1t+p_0$.

To achieve an output signal having the form $at^2+bt+c$, a parameter conversion element 722 is configured to receive the compensation parameters a, b, and c and to perform a substitution of coefficients according to a recurrence relation, as is well known to one of ordinary skill in the art. More particularly, the parameter conversion element 722 is configured to utilize the recurrence relation in order to obtain a second order polynomial having a form of $at^2+bt+c$, by calculating the input parameters $p_0$, $p_1$, and $p_2$ for the digital polynomial generator 508 from a, b, and c as follows:

$$p_0=c$$

$$p_1=a+b$$

$$p_2=2*a$$

The input parameters $p_0$, $p_1$, and $p_2$ are fed into the digital polynomial generator 508, so that the digital polynomial generator 708 calculates an output signal having a polynomial form of $at^2+bt+c$ without increasing computing of the system.

Figure 8:
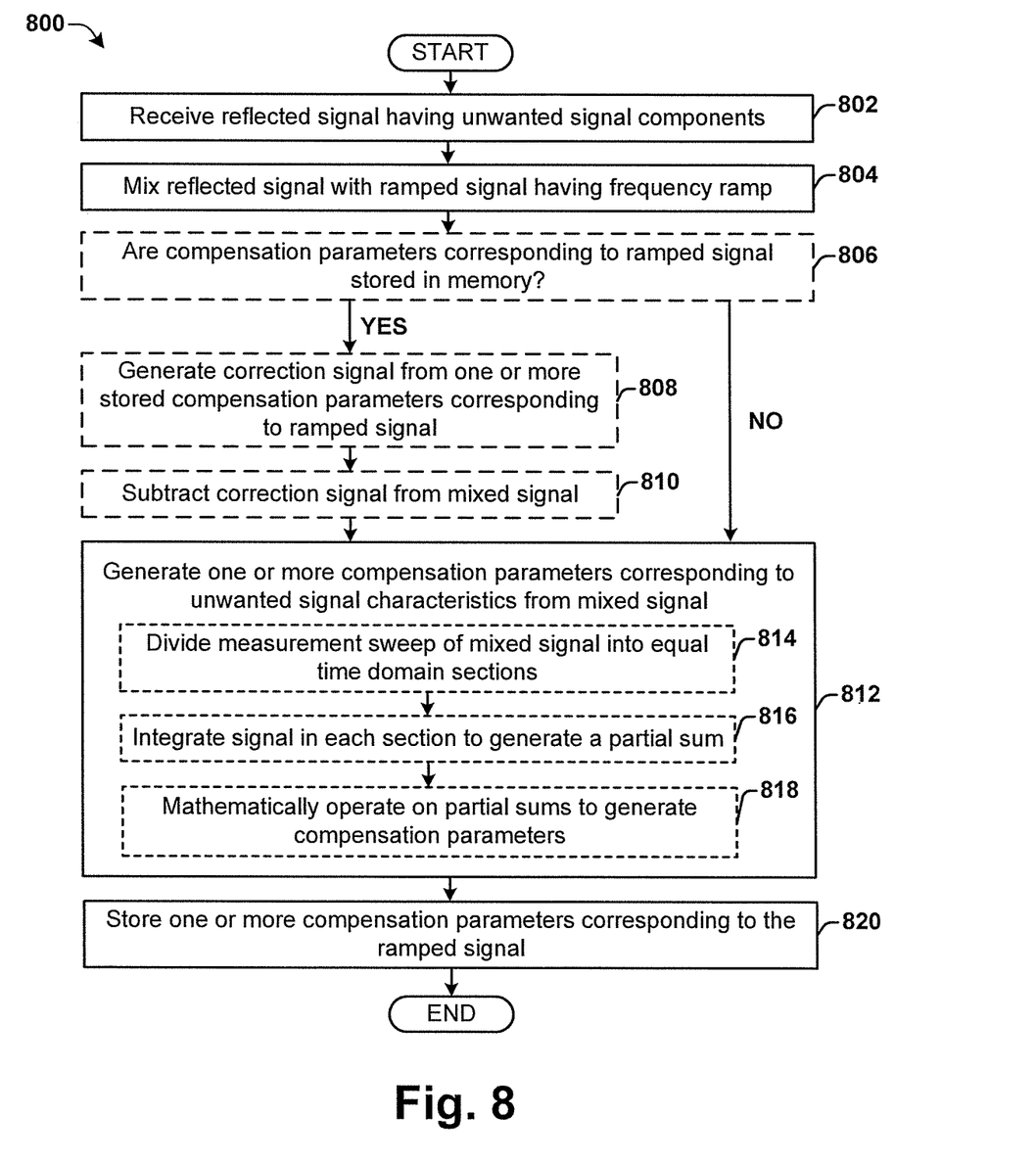
FIG. 8 is a flow diagram of an exemplary method of reducing offset errors in a sensor signal.

FIG. 8 is a flow diagram of an exemplary method 800 of reducing unwanted signal components (e.g., low frequency and DC signal components) in a FMCW radar system.

It will be appreciated that while method 800 is illustrated and described below as a series of acts or events, the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

At 802, a reflected signal having unwanted signal components is received. The reflected signal comprises a signal transmitted from a radar system, which has reflected off of an object and returned to the radar system.

At 804, the reflected signal is mixed with a ramped signal having a continually varying frequency ramp. In some embodiments the ramped signal may comprise a sawtooth waveform.

In some embodiments, method 800 may check to determine if one or more compensation parameters corresponding to the ramped signal are stored in memory (e.g., from a prior measurement sweep) at 806. In other embodiments, wherein the one or more compensation parameters have been pre-loaded into memory, acts 806-810 may be skipped.

If compensation parameters corresponding to the ramped signal are not stored in memory the method proceeds to 812.

If compensation parameters corresponding to the ramped signal are stored in memory, a correction signal may be selectively generated from one or more stored compensation parameters corresponding to the ramped signal, at 808. At 810, the correction signal is subtracted from the mixed signal. The correction signal reduces unwanted frequency components (e.g., low frequency and/or DC components) in the mixed signal. In various embodiments, the correction signal may comprise a polynomial function or harmonic functions.

At 812, one or more compensation parameters corresponding to unwanted signal components are generated.

In some embodiments, the compensation parameters are generated by dividing a measurement sweep of the mixed signal (a temporal section of the mixed signal generated at 804) into a number of equal time-domain sections at 814. At 816, signals in each of the equal time-domain sections are integrated to generate a number of partial sums equal to the number of equal time-domain sections. The partial sums are then mathematically operated upon to generate the one or more compensation parameters at 818.

At 820, one or more compensation parameters corresponding to the ramped signal are stored.

The method may repeat over multiple measurement sweeps. After one or more compensation parameters are stored for a ramped signal (820), a correction signal corresponding to the ramped signal may be determined from one or more stored compensation parameters at 808.

It will be appreciated that equivalent alterations and/or modifications may occur to those skilled in the art based upon a reading and/or understanding of the specification and annexed drawings. The disclosure herein includes all such modifications and alterations and is generally not intended to be limited thereby. For example, although the disclosed system is illustrated as having two offset correction circuits and two feedback loops, one of ordinary skill in the art will appreciate that a disclosed system may comprise more than two offset correction circuits and/or feedback loops.

In addition, while a particular feature or aspect may have been disclosed with respect to only one of several implementations, such feature or aspect may be combined with one or more other features and/or aspects of other implementations as may be desired. Furthermore, to the extent that the terms "includes", "having", "has", "with", and/or variants thereof are used herein, such terms are intended to be inclusive in meaning—like "comprising." Also, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions

What is claimed is:
1. A receiver, comprising:
a signal generator configured to generate a plurality of ramped signals, having continually varying frequency ramps, and to provide one of the plurality of ramped signals to a transmit antenna;
a receive antenna port configured to receive a reflected signal, comprising a time shifted version of the one of the plurality of ramped signals that is reflected off of an object that is external to the receiver, and to provide the reflected signal to a receiver chain;

a memory element configured to store compensation parameters corresponding to the plurality of ramped signals; and a signal correction element arranged within a feedback path extending between points in the receiver chain and configured to generate a correction signal that is provided to the receiver chain, that reduces unwanted signal components in the reflected signal, based upon stored compensation parameters corresponding to the one of the plurality of the ramped signals.

2. The receiver of claim 1, further comprising:

an parameter extraction element configured to receive a feedback signal, by way of the feedback path and to generate one or more compensation parameters based upon the feedback signal, wherein the one or more compensation parameters are stored in the memory element.

3. The receiver of claim 2, wherein the parameter extraction element is configured to:

perform a measurement sweep of the reflected signal over a time period;

divide the measurement sweep into equal time-domain sections;

integrate the reflected signal in respective equal time-domain sections to generate one or more partial sums; and mathematically operate upon the one or more partial sums to generate the one or more compensation parameters.

4. The receiver of claim 3, wherein the parameter extraction element comprises:

an adder having an input node configured to receive the feedback signal;

an accumulator having an output node connected to the input node of the adder, such that an output signal of the accumulator is added to the feedback signal to generate the one or more partial sums; and a calculation element configured to calculate one or more compensation parameters from the one or more partial sums.

5. The receiver of claim 3, wherein the correction signal comprises a second order polynomial function generated based upon a first compensation parameter, a second compensation parameter, and a third compensation parameter.

6. The receiver of claim 5, wherein the signal correction element is configured to:

generate the first compensation parameter to be equal to the sum of a negative of a first partial sum, a negative of a second partial sum, a third partial sum, and a fourth partial sum;

generate the second compensation parameter to be equal to two multiplied by the sum of the first partial sum, a negative of the second partial sum, a negative of the third partial sum, and the fourth partial sum; and generate the third compensation parameter to be equal to one/sixth multiplied by the sum of a negative of the first partial sum, seven multiplied by the second partial sum, seven multiplied by the third partial sum, and a negative of the fourth partial sum.

7. The receiver of claim 2, wherein the compensation parameters comprise an average of a plurality of compensation parameters determined by the parameter extraction element over a plurality of separate time domain measurements sweeps of the reflected signal.

8. The receiver of claim 1, further comprising:

an intermediate frequency signal processing element arranged within the receiver chain;

a digital signal processing unit arranged within the receiver chain downstream of the intermediate frequency signal processing element; and wherein the feedback path extends from a first position between the intermediate signal processing element and the digital signal processing unit to a second position upstream of the intermediate signal processing element.

9. The receiver of claim 1, further comprising:

a parameter extraction element configured to receive a feedback signal, by way of the feedback path and to generate one or more compensation parameters based upon the feedback signal, which are stored in the memory element; and a correction signal generator configured to receive a trigger signal from the signal generator which indicates a change in the plurality of ramped signals and the one or more compensation parameters from the parameter extraction element, and to generate a correction signal that is provided to the receiver chain.

10. A radar system, comprising:

a ramped signal generator configured to generate a plurality of ramped signals, having continually varying frequency ramps, and to provide one of the plurality of ramped signals to a transmission path and a reception path;

a receive mixer located within the reception path and configured to generate a mixed signal comprising the one of the plurality of ramped signals mixed within a reflected signal that is reflected off of an object that is external to the radar system and that has unwanted signal components; and a signal correction element configured to:
determine one or more compensation parameters, from a measurement sweep of the mixed signal, for unwanted signal components corresponding to the one of the plurality of ramped signals,
to store the one or more compensation parameters,
to generate a correction signal that, reduces the unwanted signal components in the reflected signal, based upon stored compensation parameters corresponding to the one of the plurality of the ramped signals;

an parameter extraction element configured to receive a feedback signal, by way of a feedback path extending from a location in the reception path downstream of the receive mixer, and to generate one or more compensation parameters based upon the feedback signal;

a memory element configured to store the one or more compensation parameters corresponding to the plurality of ramped signals; and a correction signal generator configured to receive the stored one or more compensation parameters from the memory element and to generate the correction signal based upon the stored one or more compensation parameters.

11. The radar system of claim 10, wherein the one or more compensation parameters comprise an average of a plurality of compensation parameters determined by the parameter extraction element over a plurality of measurements sweeps.

12. The radar system of claim 10, wherein the correction signal generator is configured to generate the correction signal comprising a polynomial function.

13. The radar system of claim 10, wherein the correction signal generator comprises:

a digital polynomial generator configured to receive the one or more compensation parameters from the memory element and to generate the correction signal therefrom; and a digital-to-analog-converter configured to convert the correction signal to an analog signal, which is subtracted from the mixed signal.

14. The radar system of claim 10, wherein the correction signal generator comprises:
an analog polynomial generator configured to receive the one or more compensation parameters from the memory element and to generate the correction signal therefrom.

15. The radar system of claim 10, wherein the parameter extraction element comprises:
an adder having an input node configured to receive the feedback signal;
an accumulator having an output node connected to the input node of the adder, such that an output signal of the accumulator is added to the feedback signal to generate one or more partial sums; and
a calculation element configured to calculate one or more compensation parameters from the one or more partial sums.

16. The radar system of claim 15, wherein the correction signal comprises a second order polynomial generated based upon a first compensation parameter, a second compensation parameter, and a third compensation parameter.

17. The radar system of claim 16, wherein the calculation element is configured to:
generate the first compensation parameter to be equal to the sum of a negative of a first partial sum, a negative of a second partial sum, a third partial sum, and a fourth partial sum;
generate the second compensation parameter to be equal to two multiplied by the sum of the first partial sum, a negative of the second partial sum, a negative of the third partial sum, and the fourth partial sum; and
generate the third compensation parameter to be equal to one/sixth multiplied by the sum of a negative of the first partial sum, seven multiplied by the second partial sum, seven multiplied by the third partial sum, and a negative of the fourth partial sum.

18. A method of reducing unwanted signal in a radar system, comprising:
receiving a reflected signal that is reflected off of an object that is external to the radar system and that has unwanted signal components;
mixing the reflected signal with a ramped signal having a frequency ramp to generate a mixed signal;
selectively generating a correction signal from one or more compensation parameters that correspond to the ramped signal and that are stored in a memory element;
subtracting the correction signal from the mixed signal to reduce unwanted signal components in the mixed signal;
generating the one or more compensation parameters for unwanted signal components corresponding to the ramped signal; and
storing the one or more compensation parameters in the memory element.

19. The method of claim 18, wherein generating one or more compensation parameters comprises:
performing a measurement sweep of a received signal over a time period;
dividing the measurement sweep into equal time-domain sections;
integrating the reflected signal in respective equal time-domain sections to generate one or more partial sums; and
mathematically operating upon the one or more partial sums to generate the one or more compensation parameters.

20. The method of claim 19, mathematically operating upon the one or more partial sums to generate the one or more compensation parameters, comprises:
generating a first compensation parameter to be equal to the sum of a negative of a first partial sum, a negative of a second partial sum, a third partial sum, and a fourth partial sum;
generating a second compensation parameter to be equal to two multiplied by the sum of the first partial sum, a negative of the second partial sum, a negative of the third partial sum, and the fourth partial sum; and
generating a third compensation parameter to be equal to one/sixth multiplied by the sum of a negative of the first partial sum, seven multiplied by the second partial sum, seven multiplied by the third partial sum, and a negative of the fourth partial sum.

21. A receiver, comprising:
a signal generator configured to generate a plurality of ramped signals, having continually varying frequency ramps, and to provide one of the plurality of ramped signals to a transmit antenna;
a receive antenna port configured to receive a reflected signal, comprising a time shifted version of the one of the plurality of ramped signals that is reflected off of an object that is external to the receiver, and to provide the reflected signal to a receiver chain;
a memory element configured to store compensation parameters corresponding to the plurality of ramped signals;
a signal correction element configured to generate a correction signal, that reduces unwanted signal components in the reflected signal, based upon stored compensation parameters corresponding to the one of the plurality of the ramped signals;
an parameter extraction element configured to receive a feedback signal, by way of a feedback path and to generate one or more compensation parameters based upon the feedback signal; and
wherein the one or more compensation parameters are stored in the memory element.

* * * * *